United States Patent [19]

Hoiberg

[11] Patent Number: 5,153,564
[45] Date of Patent: Oct. 6, 1992

[54] LEAK DAMAGE PREVENTION SYSTEM

[76] Inventor: Dane A. Hoiberg, 402 Fallingstar, Irvine, Calif. 92714

[21] Appl. No.: 642,682

[22] Filed: Jan. 17, 1991

Related U.S. Application Data

[62] Division of Ser. No. 410,641, Sep. 21, 1989, Pat. No. 5,008,650.

[51] Int. Cl.$^5$ .............................................. G08B 21/00
[52] U.S. Cl. ...................... 340/604; 251/11; 137/625.44
[58] Field of Search ...................... 340/604, 605, 618; 251/11; 137/625.44; 60/527, 528

[56] References Cited

U.S. PATENT DOCUMENTS

| | | | |
|---|---|---|---|
| 3,098,116 | 7/1963 | Jore et al. | 340/604 X |
| 3,613,732 | 10/1971 | Willson et al. | 137/625.44 |
| 4,297,686 | 10/1981 | Tom | 340/604 |
| 4,845,472 | 7/1989 | Gordon et al. | 340/605 |
| 5,008,650 | 4/1991 | Hoiberg | 340/604 |

FOREIGN PATENT DOCUMENTS 59-77180  5/1984  Japan .

*Primary Examiner*—Jin F. Ng
*Assistant Examiner*—Jeffery A. Hofsass
*Attorney, Agent, or Firm*—Christie, Parker & Hale

[57] ABSTRACT

A battery-powered, liquid-detection alarm and shut-off system includes an elongated sensor, an electronic controller, and a spring biased shut-off valve assembly. The sensor comprises two partially exposed conductors separated by protruding ridges of insulation. The protruding-ridge configuration enables the sensor to detect small quantities of surface water and yet be insensitive to humidity. The electronic controller maximizes battery life and protects against false alarms caused by electrical interference. The shut-off valve assembly comprises a ¼ turn ball valve and a valve-actuating assembly. The valve is set by being manually cocked to an open position, engaging a lever actuated cam and preloading a valve shut-off spring. The valve is then closed by momentarily passing an electrical current through a temperature-activated memory-shaped spring located on the valve assembly. The current is supplied by the electronic controller in response to detection of liquid by the sensor. The heating of the spring from the induced current causes the tension of the memory-shaped spring to increase, releasing the lever actuated cam and permitting the preloaded valve shut-off spring to close the valve.

8 Claims, 4 Drawing Sheets

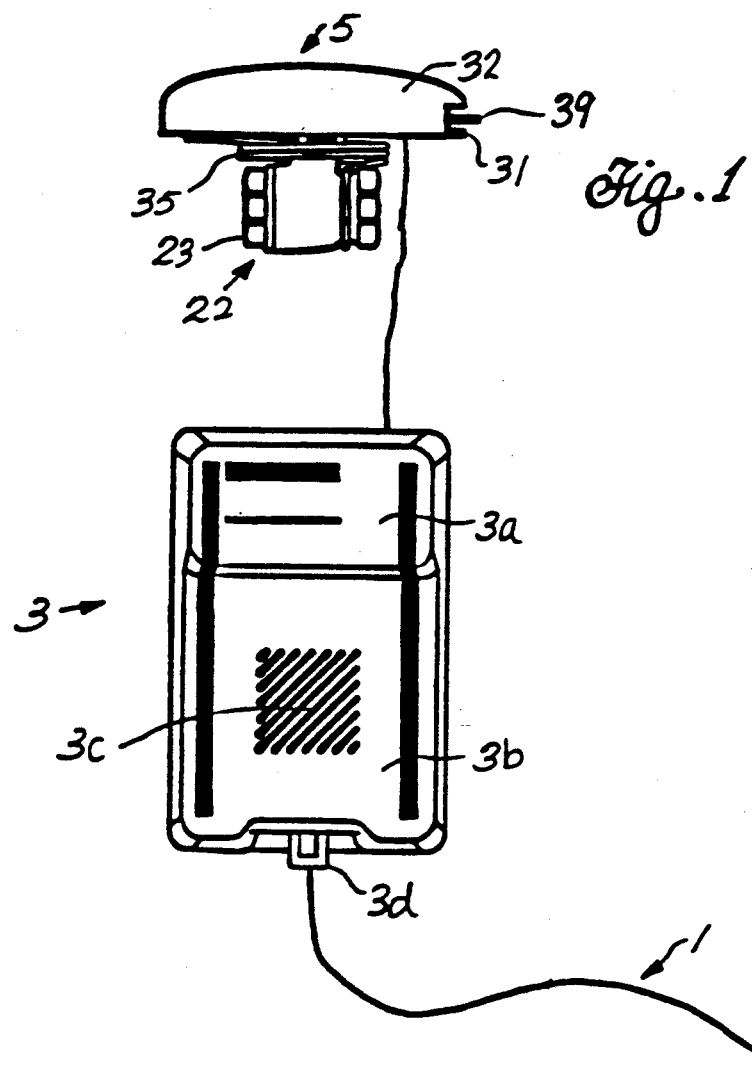
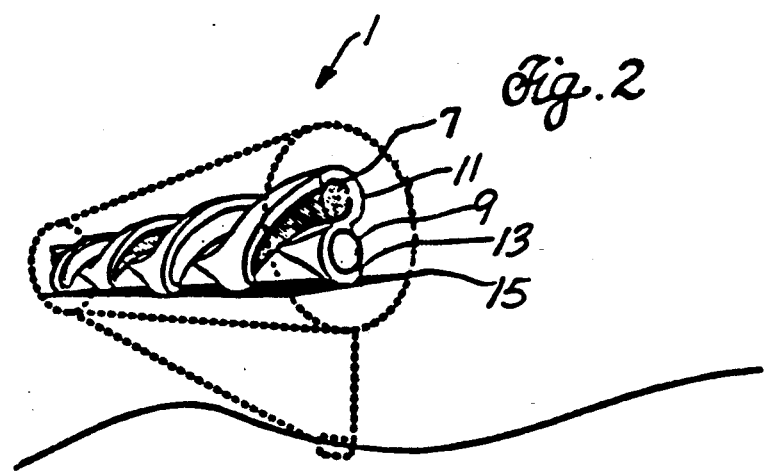

LEAK DAMAGE PREVENTION SYSTEM

This application is a divisional of U.S. Pat. No. 5,008,650, whose Ser. No. is 410,641, filed Sep. 21, 1989.

FIELD OF THE INVENTION

The present invention relates generally to the field of water detection, alert and shut-off systems, and in particular to a system having an improved surface water detection sensitivity combined with a shut-off valve assembly requiring only a momentary current drain to automatically close the valve when a water leak is detected.

BACKGROUND OF THE INVENTION

In many situations where water or other liquids are used domestically or industrially, it is important to quickly detect and limit leakage. For example, when water begins to leak from a water heater tank, air conditioning water supply, or other plumbing system, it is important to have an early warning sounded and for the water supply to the leaking system to be quickly shut off. An extended period of leakage may cause substantial damage to carpeting and flooring, as well as ceilings and walls, if leakage should occur on an upper floor of a multi-story structure, for example.

A system to automatically detect leaks, activate an alarm, and shut off the supply to the leaking system is desirable and preferably should contain its own electrical power supply. This permits the system to remain operable if flooding or other circumstances cause a loss of electrical power. The use of a self-contained power supply requires that the system have an extremely low current drain in both quiescent and operative modes so that the battery will not need frequent replacement.

Such a system can include a probe or sensor which may be placed around the base of a water heater tank or other plumbing fixture to be monitored. The sensor should be able to quickly and accurately sense the presence of surface water anywhere along its length. The sensor also should not be activated by humidity. Some prior art sensors require a large buildup of surface water before they are activated; and in some sensors water can run along the length of the sensor and still not be detected.

The prior art includes a variety of patents relating to leak detection and shut-off systems. U.S. Pat. No. 4,319,232 to Westphal, et al. discloses a liquid detection device having an elongated water sensor. The sensor has two electrical conductors covered by an insulator having a plurality of openings along its length, periodically exposing each conductor to the environment. Exposure of the sensor to a sufficient amount of water to cover two adjacent openings will produce a change of electrical resistance between the conductors. Considerable water buildup around adjacent probe openings is required to generate the change of electrical resistance between conductors needed to activate the alarm. The sensor also requires precise placement in order to detect surface water. Self-powered detecting circuitry in the Westphal et al. device activates an audible alarm and a non-latching switch, which may be used to close an externally-powered fluid control valve. The device will not operate to control externally powered circuitry if external power is lost.

U.S. Pat. No. 4,297,686 to Tom discloses a combined extended probe liquid detection and shut-off system. A solenoid type shut-off valve is used. This type of valve is typically unsuitable for long term, unattended applications due to the substantial current drain required by this type of shut-off valve. Further, the extended probe requires a slow, steady stream of water to activate the alarm. The probe is not sensitive to small drops of surface water which may be an early warning of a leak.

Shut-off valves requiring lower current drain than solenoid valves are known in the prior art. For instance, a valve control member constructed of a shape-memory material is used to control a valve. When the control member is exposed to external heat above its transition temperature, the control member reverts to a prior shape, changing the position of the valve. U.S. Pat. No. 3,613,732 to Willson, et al. discloses several embodiments of this type of valve. The valves disclosed by Willson et al. are limited in the amount of closing force produced by the control member, making them unusable as water shut-off valves in home and industrial plumbing systems where water pressures may exceed 100 lbs/in$^2$.

Thus, there is a need for an improved water detection sensor which is highly sensitive to the presence of relatively small amounts of surface water in the area being monitored, without causing false alarms because of sensitivity to humidity or dampness. There is also a need for an improved battery-operated system for detecting the presence of water, sounding an alarm, and shutting off a water supply without substantial electrical current drain or the other problems and drawbacks discussed above.

SUMMARY OF THE INVENTION

A battery-powered liquid detection, alarm and shut-off system is provided by the present invention. In one embodiment, the system comprises a liquid sensor, a spring-biased shut-off valve assembly requiring only a momentary current drain to operate, and an electronic controller responsive to the sensor for operating the shut-off valve.

Briefly, one embodiment of the sensor comprises at least two probe members comprising electrical conductors each having an outer jacket of electrical insulation partially surrounding the conductor so that a narrow, elongated, continuous axially extending region of each conductor is exposed to the environment. The two probe members are arranged to form an elongated, continuous filament-like sensor. The sensor has an insulating jacket on each probe member maintaining a relation with the insulating jacket of the other probe member so that the exposed region of each conductor is electrically isolated from the exposed region of the other conductor along the length of the sensor. The probe members, in one embodiment, form elongated regions of exposed electrical conductors closely spaced apart from each other, electrically isolated from each other by a protruding ridge of the insulating jacket, and extending in an alternating series axially along the sensor. When the sensor rests on a surface, the alternating exposed conductive regions are closely spaced from the surface, essentially by a distance similar to the thickness of the insulating jacket. They are also separated from each other by the protruding ridge of insulation. The presence of liquid on the surface to which the sensor is exposed bridges the pair of adjacent conductors to complete an electrical circuit to which the conductors are connected. The circuit can comprise an alarm device, a controller for a shut-off valve, or both.

The liquid sensor has better sensitivity than known prior art resistive probes. The sensor accurately detects the presence of small amounts of surface water, because a protruding ridge of insulation between adjacent conductors breaks the surface tension of surface water. This causes the water to bridge the adjacent conductors and complete the circuit which activates the alarm.

While sensitive to small amounts of surface water, the liquid sensor is relatively insensitive to humidity. During periods of humidity, a water film may condense on the sensor's outer surface, and the supporting surface on which the sensor rests may become damp. (These and similar effects of humidity are called "ambient condensation".) Protruding ridges of insulation between partially-exposed conductors break humidity-caused water films, or the ambient condensation, on the sensor's outer surface. Unbroken by a protruding insulating ridge, a water film, or ambient condensation, would otherwise bridge between the adjacent conductors, thereby causing a false alarm. Also, the protruding ridges of insulation elevate the conductors above supporting surfaces which might become damp from ambient condensation, thereby preventing a false alarm which would otherwise be caused if the conductors were in contact with a damp surface.

The electronic controller maximizes battery life and protects against false alarms caused by electrical interference. The electronic controller is used with a shut-off valve assembly which includes a valve and a valve actuating assembly. The valve is normally set in an open position to preload a valve shut-off spring. The valve may be then closed by momentarily passing an electrical current through a temperature-activated memory-shaped spring located on the valve assembly. The current is supplied by the electronic controller in response to detection of liquid by the sensor. The current flow produces ohmic heating in the memory-shaped spring, which causes the tension of the spring to increase, thereby releasing a lever-actuated cam which, in turn, causes the preloaded valve shut-off spring to close the valve. The relatively weak force available from the memory-shaped spring is amplified to that force necessary to shut off the valve by the preloaded shut-off spring.

In a preferred embodiment, the system also includes a valve having a valve body and a valve stem, a base plate affixed to the valve stem, and a torsion spring engaged between the base plate and the valve body for biasing the base plate and the valve stem towards a closed position. A latch-arm lever is pivotally mounted to the base plate and engagable with a locking cam on the valve body. A latching spring is engaged between the lever and the base plate such that when the base plate is rotated against the force of the torsion spring, opening the valve, the latching spring urges the lever to engage the cam. This holds the valve in a cocked-open position. An unlatching spring comprising the temperature-actuated shape-memory material is engaged between the lever and the base plate. The unlatching, memory-shaped spring pulls the lever out of engagement with the locking cam in response to ohmic heating generated by electrical current passing through the spring. This increases the spring tension of the unlatching spring, overcoming the biasing of the latching spring and the friction between the lever and the cam. This releases the lever from the cam, allowing rotation of the base plate and the valve stem by the torsion spring, shutting the valve. The latch-arm lever, when released, acts as a relay and cuts off current to the shape-memory spring. Thus, heating of the spring and therefore any current drain on the battery is momentary. When the alarm is activated, it is latched on and continues to sound even after current to the valve shut-off device is cut off, so long as the sensor is connected to the circuit and remains in contact with surface water.

These and other aspects of the invention will be more fully understood by referring to the following detailed description and the accompanying drawings.

BRIEF DESCRIPTION OF THE DRAWINGS

FIG. 1 is a semi-schematic illustration of components of a leak damage prevention system according to principles of this invention;

FIG. 2 is a schematic view of an enlarged segment of an elongated surface liquid sensor shown in FIG. 1;

DETAILED DESCRIPTION

Figure 3:
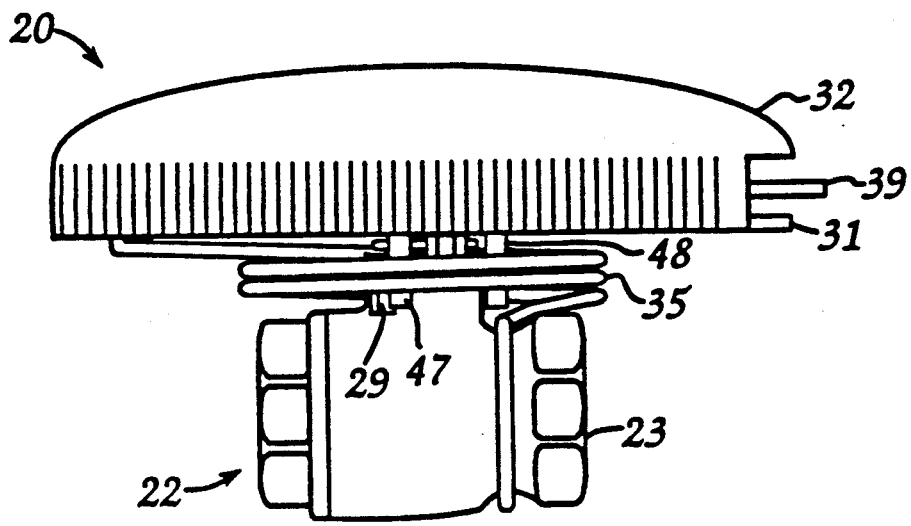
FIG. 3 is a side elevation view of a shut-off valve assembly incorporating features of the present invention.

FIG. 1 shows three principal components of the invention: an elongated liquid sensor 1, an electrical controller and alarm 3 activated in response to surface liquid detected by the sensor, and a shut-off valve assembly 5 in which a valve in a plumbing line is shut off in response to electrical current generated by the controller. The controller and alarm are contained in a housing having a battery compartment 3a, a compartment 3b for containing the controller board, and a louvered region 3c adjacent an audible alarm or buzzer sounded when surface water is detected. The sensor plugs into an electrical receptacle 3d via a standard phone jack.

As illustrated in FIG. 2, the elongated sensor 1 comprises a pair of electrical probe members in which a pair of electrical conductors 7 and 9, one for each probe, are partially exposed along the length of the sensor while remaining insulated each from the other. Preferably, 24-gauge wire is used in each probe member. Approximately 40% of the insulation jackets 11 and 13 covering the two conductors 7 and 9, respectively, is removed from opposing sides of the sensor 1 to expose the conductors. The insulating jacket of each conductor is stripped, using a die and slitter, or a heated wire, to thereby form a long, narrow, continuous slot extending lengthwise along each conductive probe member. The exposed regions are on opposite sides of the double-probe sensor and are continuously isolated electrically from each other along the length of the sensor by the insulating jackets. The probe members are joined together preferably by a common web of insulation material so as to maintain relative alignment of the two probe members along the length of the probe.

The probes are then twisted about the axis of the sensor at the rate of about four to five turns per inch, forming a tightly wound "double helix" configuration. The sensor is therefore formed as an elongated, continuous filament which can be placed on a surface 15, with the insulating jackets of the probes resting on the surface. The exposed portions of the conductors are closely and alternately spaced apart from each other axially. They are also spaced above the surface by a short distance similar to the thickness of the insulating jacket since the conductors are adhered to the outer jacket of insulation. The sensor is therefore characterized by a pair of narrow, elongated, continuous electrical conductors exposed to the environment in an alternating fashion along the length of the sensor. Adjacent conductors are separated from each other by separate, protruding ridges of insulating material spaced apart along the length of the sensor. These ridges of insulation rest on the surface and also separate the conductive regions from the surface. Thus, at any vertical plane randomly located along the length of the sensor, both conductors are exposed to the environment and are separated from each other by the protruding ridge of insulation and are also spaced from the surface by a ridge of insulation. The conductors at one end of the probe are connected to an electrical controller circuit, and the conductors at the opposite end are sealed and electrically isolated from each other.

During use, the elongated sensor can be placed on a normally dry surface, preferably in a line around the perimeter of the area to be guarded by the detection system. In the presence of surface water (or other liquid), the protruding ridges of insulation along the lower portion of the sensor break through the water's surface tension, thereby causing the water to bridge the adjacent conductors. This reduces the electrical resistance between the conductors and is detectable by the circuitry of the controller 3 which is connected to the probes at one end of the sensor.

The sensor 1 provides several advantages over known prior art sensors. The sensor's protruding-ridge configuration permits it to be sensitive to small amounts of surface water, yet at the same time it is relatively insensitive to the effects of humidity, or ambient condensation. Both conductors are always closely spaced from each other, separated by an adjacent, protruding ridge of insulating material; and they also are always near the supporting surface 15 upon which the insulating portions of sensor 1 rest.

A few drops of water splashed on or flowing into contact with sensor 1 anywhere along its length can be sufficient to activate electrical controller circuit 3. However, because protruding ridges of insulation break humidity-caused water films, or ambient condensation, which may form on the sensor's outer surface and would otherwise bridge electrical conductors 7 and 19, false activation of the electrical controller circuit 3 by humidity can be prevented. Also, since the protruding ridges support the conductors above supporting surfaces, the sensor can be constructed to be relatively insensitive to humid conditions which cause moisture to condense on, or dampen, the supporting surfaces. By having protruding ridges of insulation configured between adjacent conductors, the sensor 1 can be constructed to properly discriminate between small amounts of surface water and ambient condensation on the sensor's outer surface and its supporting surfaces. The thickness (which, for example, can be controlled by selecting wires with the proper thickness of insulating jackets) of the protruding insulating ridges should be less than about ⅛ inch in order that the sensor is sensitive to small amounts of surface water. The preferred thickness is approximately 1/64-inch.

The joined, insulating jackets of the sensor 1 cause the conductors to remain electrically isolated from each other. The protruding ridges formed by the insulating jackets also insulate the conductors from surface 15. This permits the sensor to be used to detect water on conductive, or partially conductive, surfaces such as may be encountered, for example, when the sensor is placed over nailheads found on household flooring. The twist of sensor 1 also acts to partially shield the conductors from radio-frequency and electric-field interference, eliminating, or reducing, induced electric currents in the sensor 1 which might otherwise falsely activate the controller circuit 3.

Figure 4:
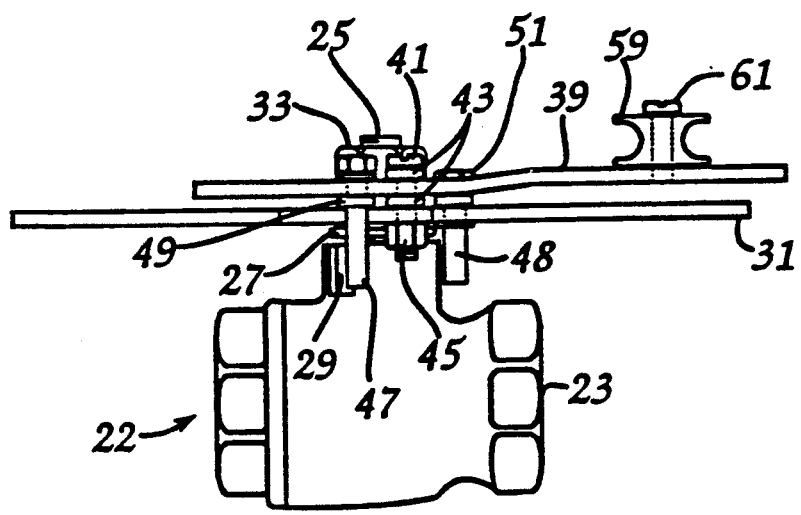
FIG. 4 is an enlarged side elevation view of components of the valve assembly shown in FIG. 3.
Figure 5:
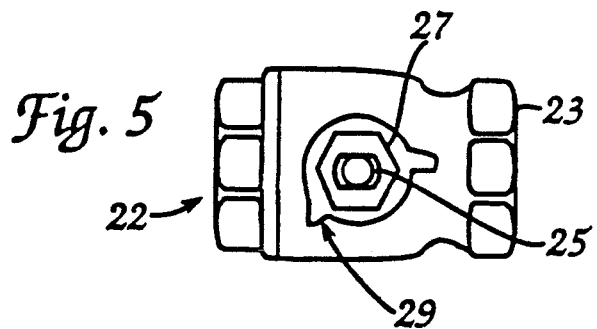
FIG. 5 is a plan view of a portion of the valve shown in FIG. 3.

Referring now to FIGS. 3–7, a shut-off valve assembly 20 preferably includes a quarter-turn valve which is spring-loaded to shut off upon release of a latch mechanism. As best shown in FIG. 5, the assembly 20 comprises a ¾" ball valve 22 having a valve body 23 and a valve stem 25 secured to the valve body by a nut 27. The presently preferred ball valve is manufactured by I.T.C. of Taiwan and may be obtained from Lincoln Products, City of Industry, Calif. As illustrated in FIG. 4, a latching cam 29 having a cam surface extending radially outward from the valve stem 25 is molded into to an upper portion of the valve body 23.

Figure 6:
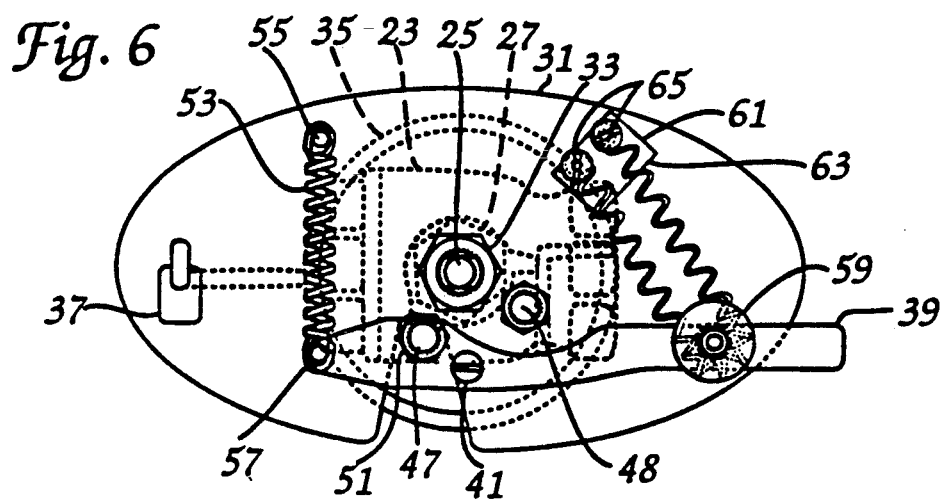
FIG. 6 is a top plan view of the valve assembly shown in FIG. 3, illustrated in the cocked, open position.
Figure 7:
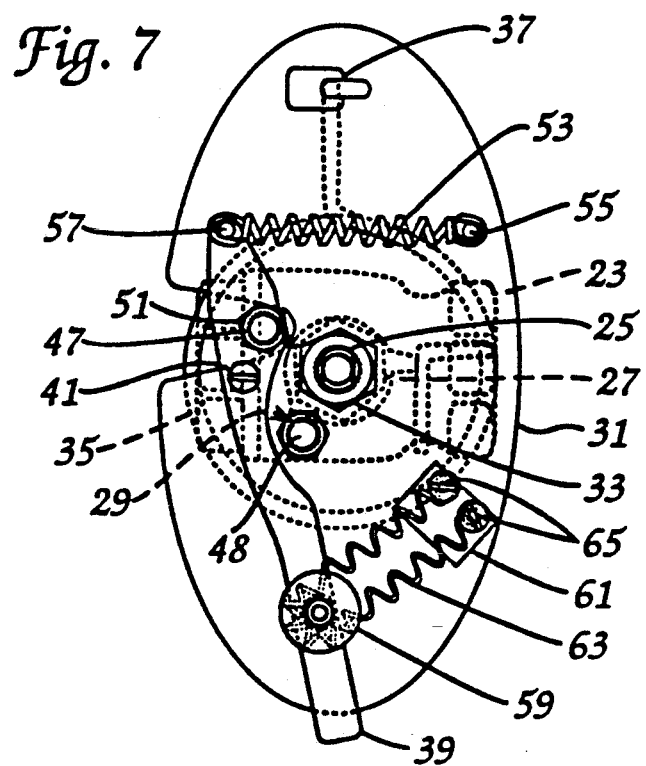
FIG. 7 is a top plan view of the valve assembly shown in FIG. 3, illustrated in the released, closed position.

FIGS. 6 and 7 illustrate an elliptical shaped base plate 31 affixed to the valve stem 25 by a valve stem nut 33. As shown in FIG. 3, the base plate 31 is covered by a plastic housing 32, which may be used as a handle to manually rotate the base plate. A ¼ rotation of the base plate 31 will open or close the ball valve 22. The base plate 31 is biased towards the closed valve position by a torsion spring 35. One end of the spring 35 is engaged in an opening 37 near the first end of the base plate 31. The other end of the spring 35 is wrapped around the valve body so that the spring is biased to rotate the base plate 31 and the valve stem 25 in a clockwise (as viewed from above in FIG. 6) direction towards the shut-off position of the valve 22. The torsion spring 35 is the motive force of the shut-off valve apparatus 5. The spring 35 is of sufficient strength to overcome the maximum expected breakaway torque of the ball valve 22. Thus, the torsion spring is forceful enough to close the valve 22 after the valve has been in service and deposits have built up inside the valve. For the presently preferred ¾" ball valve 22, the maximum-expected breakaway torque is 90 in-lbs. The torque produced by the torsion spring 35 exceeds this amount.

Referring now to FIG. 4, an elongated latch arm lever 39 is pivotally mounted relative to the base plate by a pivot bolt 41, washers 43 and a nut 45. The pivot bolt extends from the pivot point on the lever arm through an opening in the base plate. As best seen in FIG. 6, the lever 39 is mounted such that a first end extends beyond the radius of a second end of the base plate 31, by a distance sufficient for movement of the lever in order to be able to manually release the lever from the latched position; while a second end of the lever extends beyond the valve stem nut 33 to approximately the midpoint between the valve stem nut 33 and the first end of the base plate. The lever 39 is pivoted approximately two-thirds the distance from its first end towards its second end.

Referring to FIGS. 4, 6 and 7, a latching pin 47 having a collar 49 is affixed to the lever arm 39 by a nut 51.

The pin 47 extends downward from the lever arm 39 and is engagable with the latching cam 29. The lever arm 39 is biased towards the latching cam 29 by a latching spring 53. The latching spring is secured between pins 55 and 57, which are threaded into the base plate 31, and the lever arm 39, respectively. At least one of the two pins 55 and 57 are made of insulating material (e.g., nylon) to prevent conduction between the base plate and the latch arm. The pivot through the pivot bolt is also electrically insulated so that the latch arm 39 can be electrically isolated from the base plate. Electrical current can flow through the latch arm 39 only when the latch arm is latched to the cam 29.

The shut-off valve assembly 5 is set by manually rotating the housing 32 and the base plate 31 in a counter-clockwise direction (as viewed from above in FIG. 6) against the bias of the torsion spring 35. The latching spring 53 pulls the lever 39 and the pin 47 towards the latching cam 29 for engaging the pin with the cam. The base plate also carries a valve stop pin 48 which acts as a stop to prevent rotation of the valve more than 90° when the valve is automatically shut off. The valve stop also acts as a stop in the opposite direction of rotation to prevent the latch arm from being rotated in the wrong direction when setting it in the latched position.

The spatial relationship between the pivot point of the lever 39 and the point of contact between the pin 47 and the cam 29 is important. It is necessary to provide the proper face angle between the pin 47 and the cam 29 for the latching effect to operate properly. The pivot point of the lever 39, as defined by the pivot pin 41, must be exactly on the plane tangent to the loci of points defined by the valve turning circle, at the point of contact between the pin 47 and the cam 29. The pin 47 and the cam 29 meet at an angle called the "face angle." The face angle is proper when the cam 29 creates a force on the pin 47 at their point of contact equal and opposite, or nearly equal to that force created by the friction between the cam and the pin. If the face angle is too small, the cam will not hold the pin. If the angle is too large, too much force will be required to release the pin from the cam. The ideal angle depends on the specific materials being used. For example, if the cam is formed of brass and the pin is made of cold-rolled steel, the proper face angle between the cam and a line radially extending from the turning axis of the valve stem 25 is approximately 21°.

A pulley 59 is affixed to the lever 39 by a screw 61. The pulley is located on the lever 39 approximately one-third the distance from the first end of the lever 39 towards the second end. A spring block 61 is affixed to the base plate 31 near the perimeter of the base plate, on the side opposite from that of the pivot bolt 41, where the perimeter of the base plate intersects a loci of points defined by the turning circle of the pulley 59. The pulley 59 and the spring block 61 are made of Teflon (trademark of duPont), nylon or other electrically insulating material.

A temperature-activated, memory-shaped actuating spring 63 is wrapped around the pulley 59 and secured to the spring block 61 by two screws 65. Temperature-activated memory-shaped materials can be made from NiTi and copper-based alloys and other metals having the property of returning to a pre-set shape from a deformed state when heated above a specific temperature. As is well known in the art, a spring made from a memory-shape material may be stretched beyond its elastic limit and then returned to its original shape upon being heated above a transition temperature. The transition temperature may be anywhere in a range of from $-100°$ C. to $+100°$ C. depending on the alloy content of the material. The actuating spring 63 is preferably made of a material which returns to shape at about 83° C. This temperature is sufficiently high to exceed the maximum expected ambient temperature of the present invention's environment.

The size and resistance of the memory-shaped spring, the internal impedance properties of the battery power supply, and the friction and other forces resisting release of the latch mechanism must be properly matched. As is well known in the art, the maximum power dissipated by an electrical load resistance occurs when the internal resistance of the power source equals the load resistance. For many commonly available batteries this means that in order to achieve the maximum power dissipation, or the maximum ohmic heating from the battery source, the load resistance should be no less than approximately 0.5 ohms or more than about 20 ohms.

Also, in order for the shut-off assembly to function, the generated force of the memory-shaped spring must be greater than the total of the friction and other forces resisting the memory-shaped spring. All other things being equal, the larger the diameter of wire which is used to make the spring the greater the force generated when the spring is heated, and consequently the more readily the memory-shaped spring overcomes the mechanical and friction forces resisting its action. Large wire diameter memory-shaped springs, however, often have too low an electrical resistance to allow ohmic heating to the transition temperature by battery power supplies. For this reason, a memory-shaped spring has been chosen that has a suitable wire diameter matching the latch arm assembly's force requirements and the impedance/power dissipation properties of the battery power supply. Similarly, all other things being equal, the length of the wire used to make the memory-shaped spring can be changed to affect the resistance and force properties of the spring. Increasing memory-shaped spring lengths, however, increases the latch arm travel requirement, and the overall size of the assembly can become impractical with very long spring lengths. The actuating spring 63 is preferably made from a memory-shaped, NiTi wire material having a diameter of about 0.5 mm, a spring diameter of approximately ¼ inch and a length of about ¾ inch when contracted. The preferred spring has a resistance of about 1.4 Ohms and heats quickly (from ohmic heating) to the required transition temperature with the current flow induced from its connection to 1.5 V to 18 V battery power supplies (preferably two 9 V batteries connected in parallel are used since this provides sufficient power to heat the memory-shaped spring quickly and simultaneously activate the alarm horn). Such springs are available from Shape Memory Applications, Inc. 285 Sobrante Way, Suite E, Sunnyvale, Calif. 94086, or NiTi alloys Co., Box 1431, Lafayette, Calif. 94549.

Figure 8:
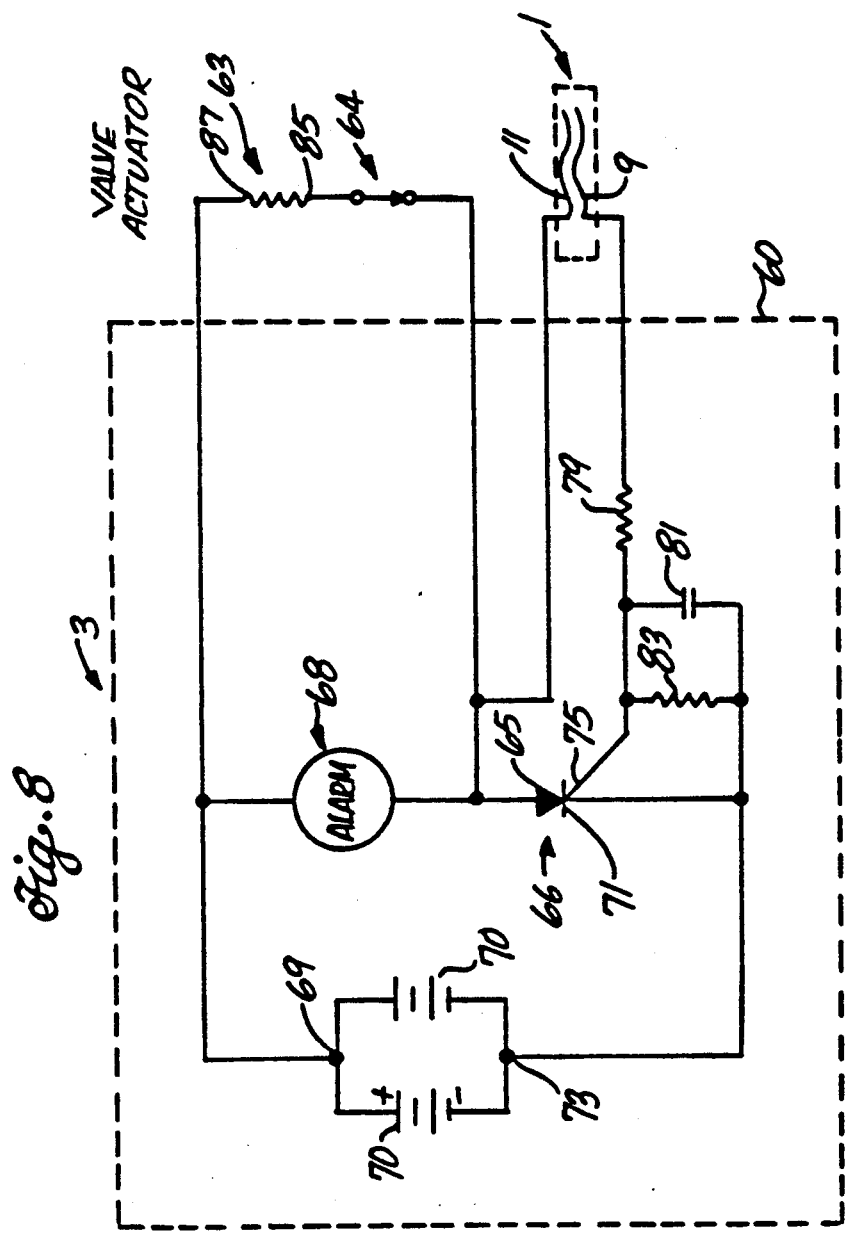
FIG. 8 is a schematic electrical schematic diagram of the preferred controller for the valve shut-off system.

The actuating spring 63 is coupled in series with the latch arm 29 which acts as a switch 64 or relay in the electrical controller circuit 3 shown in FIG. 8. The switch 64 (latch arm 29) is normally closed; and it opens, disconnecting power to the actuating spring 63, when the valve 22 has moved to the shut-off position. The metal base plate 31 acts as an electrical ground. Current flow is through the shape-metal spring, to the latch arm 39 and to the valve body. The circuit is completed only when the latch arm is latched to the cam 29.

Operation of the shut-off valve assembly 5 occurs upon detection of water by the sensor 1. This causes the controller 3 to apply a voltage across the actuating spring 63. Current flow through the actuating spring 63 results in the ohmic heating of the spring. When the actuating spring 6 reaches its transition temperature its modulus of elasticity increases sufficiently to overcome the bias of the latching spring 55, causing the latching pin 47 to disengage from the latching cam 29. This permits the torsion spring 35 to rotate the base plate 31 and the valve stem 25 in a clockwise (as viewed from above) direction, shutting the valve 22. Since the latch arm is electrically insulated from the base plate (because of its non-conductive pivot pin and other points of electrical isolation), the current in the shape-memory spring is cut off when the latch arm releases.

The controller 3 is contained within a housing 60 and has been designed to provide high sensitivity while drawing minimum current in the quiescent state. As illustrated in FIG. 8, the anode 65 of an SCR device 66 is coupled in series with an audible alarm 68 to the positive side 69 of a pair of batteries while the SCR cathode 71 is coupled to the negative side 73 of the batteries. The batteries are connected in parallel to assist in better providing impedance matching with the actuating spring. The SCR gate 75 is coupled in series with a first resistor 79 to one of the two conductors 9, 11 of the sensor 1, while the SCR anode 65 is connected to other conductor of the sensor. A capacitor 81 and a second resistor 83 are coupled in parallel with the SCR cathode 71 and the SCR gate 75. The first end 85 of the actuating spring 63 is coupled in series with a normally closed switch 64 to the SCR anode 65, while the second end 87 of the spring 63 is coupled to the positive side 69 of the battery 70.

During use, liquid which collects in a sufficient quantity will electrically bridge the conductors 9 and 11 of the sensor 2 and thereby create a relatively low electrical resistance path between the conductors, assuming the liquid is a reasonably good electrical conductor. Water is an example of a liquid that can be detected by the detection system of this invention. The resulting low resistance path between the conductors 9 and 11 allows the SCR gate 75 to be connected to the SCR anode 65 through the first resistor 79 for providing a source of gate triggering current and voltage. The resulting forward bias of the SCR gate 75 with respect to the SCR cathode 71 causes conduction from the SCR anode 65 to the SC cathode 71. This conduction completes the circuit between the battery 70, the audio alarm 68, and the actuating spring 63, causing the alarm to sound and the valve 22 to be shut off. The unlatching of the latch arm 39 from the cam 29 not only causes the valve to close but also cuts off current flow in the shape-memory spring, thereby keeping the spring from being overheated and preventing the spring 63 from being a continuing current drain on the batteries 70 while the alarm continues to sound.

Removal of the water from the conductors 9 and 11 removes the forward bias of the SCR gate 75 to the SCR cathode 71, causing conduction between the SCR cathode and the SCR anode 65 to cease. In the absence of current flow, the alarm 68 discontinues sounding. Otherwise, as long as water continues to be sensed, the alarm continues to sound. The alarm also may be shut off by unplugging the sensor jack. The first resistor 79 reduces current flow, and the second resistor 83 and capacitor act as an RF filter short to ground. Typical electrical component values comprise: resistor 79: 15K, ¼ W; resistor 83: 200K, ¼ W; capacitor 81: 0.1 uf, 50 v; and SCR: C106B.

The above described embodiment of the invention is only considered to be preferred and illustrative of the inventive concept. The scope of the invention is not restricted to this embodiment. Various and numerous other arrangements may be devised by one skilled in the art without departing from the spirit and scope of this invention. For example, material having transition temperatures of higher than 83° C. may be used for the actuating spring if required by a particular application. The valve assembly may be set to be normally closed, opening in response to a voltage signal from the controller, permitting the invention to be used to drain plumbing systems. The audible alarm may be supplemented with or replaced by a visual alarm or a relay to energize remotely located circuitry. The battery power supply may be augmented with or replaced by an AC power supply to eliminate the need to replace batteries, or to maintain the charge of rechargeable batteries which may automatically provide power to the system in the event of a power failure. Accordingly, the described embodiment should not be used to limit the scope of the invention which is defined in the following claims.

What is claimed is:

1. A liquid detection and shut-off system comprising:
   means for detecting the presence of a liquid on a normally dry surface area and for producing an electrical output in response to detection of the liquid;
   an electrically operated shut-off valve assembly comprising:
   (a) a housing,
   (b) valve means in the housing adapted for movement between an open position and a closed position for opening or shutting off a supply of liquid,
   (c) biasing means for urging the valve means to the closed position, and
   (d) latch means normally engaging the valve means to hold the valve means in the open position, the latch means being adapted for unlatching for moving the valve means to the closed position, the latch means including an unlatching spring member comprising a temperature-actuated shape-memory material which is movable in response to ohmic heating from electrical current passing through the spring member to thereby cause the valve means to move to the closed position and to disconnect the electrical current wherein movement back to the open position and relatching of the latching means is performed manually after the spring member has cooled, and
   electrical current means operatively connected to the detecting means and shut-off valve assembly for sensing electrical current flow in the spring in response to receiving said output from the detecting means to disengage the valve means and close the valve.

2. Apparatus according to claim 1 including alarm means electrically connected to the electrical current means, an alarm being activated in response to said resistivity changes detected by the sensor.

3. Apparatus according to claim 1 including means for cutting off the supply of electrical current to the spring member after the valve means moves to the closed position.

4. An electrically operated valve control assembly comprising:
  valve means adapted for movement between a first and a second position;
  means for normally urging the valve means to the first position;
  latch means normally engaging the valve means to hold the valve means in the second position, the latch means being adapted for unlatching for moving the valve means to the first position, the latch means including an unlatching spring member comprising a temperature-actuated shape-memory material which is movable in response to ohmic heating from electrical current passing through the spring member to thereby cause the valve means to move to the first position and to disconnect the electrical current wherein movement back to the second position and relatching of the latching means is performed manually after the spring member has cooled; and
  electrical current means for generating electrical current flow in the spring member to unlatch the latch means.

5. Apparatus according to claim 4 in which the valve means comprises an off valve for opening or closing off a supply of liquid under pressure.

6. Apparatus according to claim 4 including a liquid sensor probe member for sensing the presence of surface liquid, and in which an electrical current means is electrically connected to the sensor.

7. An electrically operated liquid shut-off valve assembly comprising:
  a shut-off valve having a body and a stem;
  a base plate affixed to the valve stem;
  an actuator spring engaged between the base plate and the valve body for biasing the valve stem towards a closed position;
  a locking arm affixed to the valve body;
  a latch arm lever pivotally mounted to the base plate and engagable with a locking cam;
  a latching spring engaged between the lever and the base plate for such that when the base plate is rotated against the force of the torsion spring for opening the valve, the latching spring urges the lever to engage the cam holding the valve in a cocked open position; and
  an unlatching spring comprising temperature-actuated shape-memory material engaged between the lever and the base plate for biasing the lever out of engagement with the cam in response to electrical current passing through the unlatching spring for overcoming the biasing of the latching spring to allow rotation of the base plate and the valve stem by the torsion spring, thereby moving the valve towards the closed position.

8. Apparatus according to claim 7 including means for cutting off the supply of electrical current to the unlatching spring in response to the lever disengaging from the arm.

* * * * *